(12) United States Patent
Sarwe et al.

(10) Patent No.: US 12,552,267 B2
(45) Date of Patent: Feb. 17, 2026

(54) VEHICLE AND VEHICLE MANAGEMENT SYSTEM WITH A PREDICTIVE POWER SYSTEM

(71) Applicant: Hyster-Yale Group, Inc., Fairview, OR (US)

(72) Inventors: Pankajkumar Sarwe, 's-Hertogenbosch (NL); Fady Abdelmasih, Arnhem (NL); Neha Roy, Arnhem (NL); Willem Jacobus Nieuwland, Helmond (NL)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 351 days.

(21) Appl. No.: 18/093,658

(22) Filed: Jan. 5, 2023

(65) Prior Publication Data

US 2024/0227578 A1    Jul. 11, 2024

(51) Int. Cl.
*B60L 15/20* (2006.01)
*B60L 50/75* (2019.01)
*B60L 58/40* (2019.01)

(52) U.S. Cl.
CPC ........... *B60L 15/2045* (2013.01); *B60L 50/75* (2019.02); *B60L 58/40* (2019.02)

(58) Field of Classification Search
None
See application file for complete search history.

(56) References Cited

U.S. PATENT DOCUMENTS 8,098,054 B2 * 1/2012 Verschuur .................. H02P 9/06
322/24
9,356,445 B2 5/2016 Ge
(Continued)

FOREIGN PATENT DOCUMENTS

CN    102837696 B    9/2015
DE    102013214814 A1    2/2015
(Continued)

OTHER PUBLICATIONS

Sai Vastav Mokkapati; Master Thesis Report, "Modeling, Testing, and Selecting Optimal Fuel Cell Hybrid Energy Management Strategy," Hogeschool van Arhem en Nijmegen Univ. of Appl. Sci. (Sep. 27, 2018).

(Continued)

*Primary Examiner* — Rachid Bendidi
*Assistant Examiner* — Nada Mahyoob Alqaderi

(57) ABSTRACT

A vehicle comprises a power system, including an electrical energy storage system, an electrical generator electrically connected to the electrical energy storage system, an electrically powered actuator configured to receive energy from the power system; a memory configured to store a profile, and a controller configured to change an operation of the electrical generator before a change in demand from the power system based on the profile and a state of the electrical energy storage system. The vehicle management system may also comprise a communication interface, a memory configured to store data related to predicted changes in demand from a power system of a vehicle including an electrical generator and an electrical energy storage system, and a processor configured to generate a profile for control of electrical energy management of the power system of the vehicle based on the data and to transmit the profile to the vehicle through the communication interface.

25 Claims, 6 Drawing Sheets

(56) References Cited

U.S. PATENT DOCUMENTS

| | | | |
|---|---|---|---|
| 9,673,462 B2* | 6/2017 | Skidmore | H01M 8/04298 |
| 10,944,285 B2 | 3/2021 | Raffaelli et al. | |
| 2014/0277931 A1* | 9/2014 | Crowe | B60L 58/31 |
| | | | 701/36 |
| 2017/0072804 A1 | 3/2017 | Miranda et al. | |
| 2019/0002251 A1 | 1/2019 | Resch | |
| 2020/0042062 A1* | 2/2020 | Astefanous | H02J 7/0068 |
| 2020/0282855 A1* | 9/2020 | Slutzky | B60L 53/64 |
| 2021/0179063 A1* | 6/2021 | Tokura | B60W 20/13 |
| 2022/0190597 A1* | 6/2022 | Tural | H02S 40/38 |

FOREIGN PATENT DOCUMENTS

| | | | |
|---|---|---|---|
| DE | 102021116120 A1 * | 12/2022 | B60W 30/14 |
| EP | 2314848 A1 | 4/2011 | |
| EP | 2655241 A2 | 10/2013 | |
| WO | WO-2022268552 A1 * | 12/2022 | B60W 10/08 |

OTHER PUBLICATIONS

European Extended Search Report, Appl. 23220435.4 (May 6, 2024).

* cited by examiner

VEHICLE AND VEHICLE MANAGEMENT SYSTEM WITH A PREDICTIVE POWER SYSTEM

TECHNICAL FIELD

This disclosure relates generally to vehicles and vehicle management systems with a predictive power system. This disclosure relates more specifically to materials-handling vehicles and materials-handling vehicle management systems with a predictive power system.

BACKGROUND

Vehicles may have multiple power sources. For example, a vehicle may include an internal combustion engine, a generator, and a battery. Energy to move the vehicle or use other systems of the vehicle may be provided from the battery and/or the generator driven by the internal combustion engine. However, this technique of generating electrical power is reactive. An operator provides an input through controls and the system generates power in response to that input.

SUMMARY OF DISCLOSURE

Some embodiments include a vehicle, comprising: a power system, including: an electrical energy storage system; and an electrical generator electrically connected to the electrical energy storage system; an electrically powered actuator configured to receive energy from the power system; a memory configured to store a profile; and a controller configured to change an operation of the electrical generator before a change in demand from the power system based on the profile and a state of charge of the electrical energy storage system.

In some embodiments, the vehicle further comprises a positioning system configured to determine a position of the vehicle; wherein the controller is further configured to change the operation of the electrical generator before the change in demand from the power system based on the position.

In some embodiments, the controller is further configured to: determine a future power demand from the power system based on the profile; and modify a present power output of the electrical generator based on the future power demand.

In some embodiments, the controller is further configured to: modify the present power output of the electrical generator such that a magnitude of a rate of change of the present power output is less than a threshold that is less than a maximum rate of change of the present power output.

In some embodiments, the controller is further configured to: modify the present power output of the electrical generator based on the future power demand and the state of charge of the electrical energy storage system.

In some embodiments, the controller is further configured to: modify the present power output of the electrical generator such that the electrical generator is operating in a maximum efficiency mode when the change in demand from the power system occurs.

In some embodiments, the electrical generator includes a fuel cell; and the electrical energy storage system includes a battery.

In some embodiments, the change in demand from the power system comprises a change in at least one of: supplying energy to the electrically powered actuator; receiving energy from the electrically powered actuator; supplying energy to a drive system of the vehicle; and receiving energy from the drive system of the vehicle.

In some embodiments, the controller is further configured to: change the operation of the electrical generator before the change in demand from the power system based on the profile to limit an input to the electrical energy storage system and/or output power from the electrical energy storage system to be less than a threshold.

In some embodiments, the controller is further configured to: limit a variation in the change the operation of the electrical generator before the change in demand from the power system based on the profile.

Some embodiments include a vehicle management system comprising: a communication interface; a memory configured to store data related to predicted changes in demand from a power system of a vehicle including an electrical generator and an electrical energy storage system; and a processor configured to: generate a profile for control of electrical energy management of the power system of the vehicle based on the data; and transmit the profile to the vehicle through the communication interface.

In some embodiments, the processor is further configured to: receive historical data from the vehicle; and generate the profile for control of the electrical energy management of the power system of the vehicle based on the historical data.

In some embodiments, the processor is further configured to: generate the profile for control of the electrical energy management of the power system of the vehicle based on the data including state of charge data for the electrical energy storage system of the power system of the vehicle.

In some embodiments, the processor is further configured to: receive environmental data associated with an operating environment of the vehicle; and generate the profile for control of the electrical energy management of the power system of the vehicle based on the environmental data.

In some embodiments, the processor is further configured to: receive scheduling data associated with an operating environment of the vehicle; and generate the profile for control of the electrical energy management of the power system of the vehicle based on the scheduling data.

Some embodiments include a method comprising: receiving data associated with future operations of a vehicle; generating a profile for controlling electrical energy management of a power system of the vehicle including an electrical generator and an electrical energy storage system based on the data associated with the future operations of the vehicle; and controlling the electrical energy management of the power system of the vehicle based on the profile.

In some embodiments, the method further comprises receiving historical data from the vehicle; and generating the profile for controlling the electrical energy management of the power system of the vehicle based on the historical data.

In some embodiments, the method further comprises generating the profile for controlling the electrical energy management of the power system of the vehicle based on the data including state of charge data for an electrical energy storage system of the power system of the vehicle.

In some embodiments, the method further comprises receiving environmental data associated with an operating environment of the vehicle; and generating the profile for controlling the electrical energy management of the power system of the vehicle based on the environmental data.

In some embodiments, the method further comprises receiving scheduling data associated with an operating environment of the vehicle; and generating the profile for controlling the electrical energy management of the power system of the vehicle based on the scheduling data.

DETAILED DESCRIPTION OF EMBODIMENTS

Figure 1:
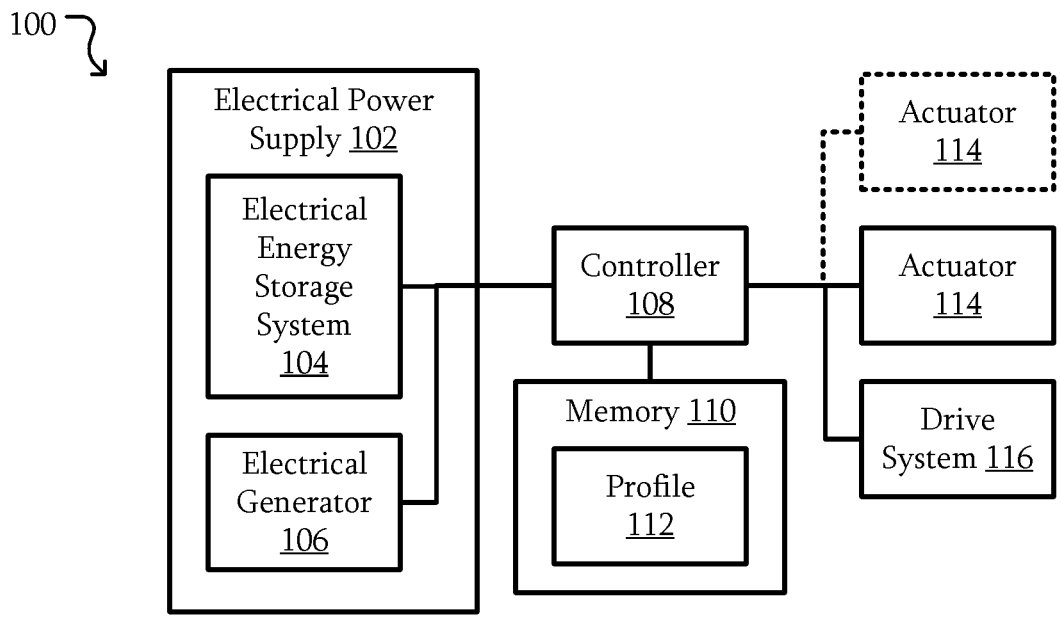
FIG. 1 is a block diagram of a vehicle with a predictive power system according to some embodiments.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete and will convey the scope of the disclosure to those skilled in the art.

Embodiments relate to vehicles and vehicle management system with a predictive power system. Reactive operation of an power system of a vehicle may operate components of the power system in a non-optimal manner and/or a manner that may decrease a lifetime of the power system. As will be described in further detail below, a vehicle may operate based on a profile such that the power system is operated in a predictive manner. As a result, the operation may be optimized, the lifetime of the power system may be increased, and/or the total cost of ownership may be reduced.

Embodiments described below may operate to maintain suitable operation for both an electrical energy generation system, for example, a fuel cell, and an electrical energy storage system, for example, a battery or battery bank. Both electrical energy generation systems and electrical energy storage systems have operational parameters that may extend the useful life of such systems. For example, fuel cells may have a longer useful life if they are operated at relatively constant electrical energy output ranges, are transitioned from one electrical energy output level to another electrical energy output level at a relatively gentle ramp rate, are provided a warm-up period and then not shut down, or are shut down relatively infrequently, during operation, are operated within select temperature ranges, and etc. Batteries may have a longer useful life if they are not overcharged, are not discharged below select levels, are operated within select temperature ranges, and are charged and discharged at select rates. Although particular operating parameters and techniques of operating electrical energy generation systems and/or electrical energy storage systems have been used as examples, other types of electrical energy generation systems and/or electrical energy storage systems may have different operating parameters and techniques of operating that may provide benefits such as those listed below. Embodiments described below, and other embodiments, balance operation of an electrical energy generation system and an electrical energy storage system to provide favorable operational parameters for both systems to enhance one or more of (1) useful life for one or both systems, (2) fuel efficiency, (3) cost effectiveness for operating one or both systems, and (4) efficient use of energy generated by recovery systems, singularly, or in any combination. Embodiments described below, and other embodiments, may balance operation of an electrical energy generation system and an electrical energy storage system to achieve other suitable objectives.

FIG. 1 is a block diagram of a vehicle 100 with a predictive power system 102 according to some embodiments. The vehicle 100 includes a power system 102, a controller 108, a memory 110, one or more electrically powered actuators 114, and a drive system 116. Examples of the vehicle 100 include trucks, container handlers, reach stackers, top loaders, or the like.

The power system 102 includes an electrical energy storage system 104 and an electrical generator 106. The electrical generator 106 is electrically connected to the electrical energy storage system 104. Examples of the electrical energy storage system 104 includes a battery, a supercapacitor, flywheel system, or the like or a combination of such systems. Examples of the electrical generator 106 include a fuel cell system such as a hydrogen fuel cell system, a methanol fuel cell, or the like. Other examples of the electrical generator include an internal combustion engine coupled to an electrical generator, or the like. The electrical generator 106 may include fuel storage systems associated with the type of electrical generator 106.

The electrically powered actuator 114 is configured to receive energy from the power system 102. Examples of the electrically powered actuator 114 include a lifting mechanism, telescoping mechanism, hoist, crane, pulley, winch, motor, pump, or the like. The actuator 114 may be attached to a mechanical structure such as an arm, boom, shovel, bucket, forks, or the like. The actuator 114 may be configured to regenerate energy and return at least some energy to the power system 102.

The drive system 116 includes a system configured to move the vehicle 100. The drive system 116 may include wheels, tracks, transmissions, electric motors, or the like. The drive system 116 may be configured to receive power from the power system 102. The drive system 116 may be configured to regenerate energy and return at least some energy to the power system 102.

The memory 110 may include any storage medium. For example, the memory may include a dynamic random access memory (DRAM), according to various standards such as DDR-DDR5 or the like, static random access memory (SRAM), non-volatile memory such as Flash, spin-transfer torque magentoresistive random access memory (STT-MRAM), or Phase-Change RAM, magnetic or optical media, or the like. The memory 110 may include combinations of such memories.

The memory 110 is configured to store a profile 112. The profile 112 includes information related to changes in the operation of the electrical generator 106, information related to predicted changes in demand, or the like. The profile 112 may include a variety of different types of information as will be described in further detail below.

The controller 108 may include a general purpose processor, a digital signal processor (DSP), an application specific integrated circuit, a microcontroller, a programmable logic device, discrete circuits, a combination of such devices, or the like. Although only one controller 108 is illustrated, multiple controller 108 may be present. The controller 108 or parts thereof may have a single processing core or multiple processing cores. The controllers 108 may be distributed across the vehicle 100, such as being part of the power system 102, part of the actuator 114, part of the drive system 116, or the like. The controllers 108 may be communicatively coupled together by a network such as a controller area network.

The controller 108 may be configured to change an operation of the electrical generator 106, for example, before a change in demand from the power system 102 occurs where the change of operation of the electrical generator 106 is based on the profile 112. Examples of a change in demand from the power system 102 include changes in energy supplied to the actuator 114, changes in energy regenerated from the actuator 114, changes in energy supplied to the drive system 116, changes in energy regenerated from the drive system 116, or other suitable changes. Using the profile 112, the controller 108 may predict an upcoming operation for the vehicle 100. Before the predicted operation occurs, the controller 108 may be configured to use to profile 112 to operate the electrical generator 106, charge or discharge the electrical energy storage system 104, or the like as will be described in further detail below.

In some embodiments, the controller 108 may be configured to change the operation of the electrical generator 106 based on a state of the electrical energy storage system 104. A state of the electrical energy storage system 104 may include a state of charge (SOC) of the electrical energy storage system 104, a state of health (SOH) of the electrical energy storage system 104, an operating temperature of the electrical energy storage system 104, similar states of any components of the electrical energy storage system 104, an ambient temperature around the electrical energy storage system 104, or similar states.

In some embodiments, the controller 108 may be configured to change the operation of the electrical generator 106 based on a state of other systems of the vehicle 100. For example, the controller 108 may be configured to change the operation of the electrical generator 106 based on an amount of fuel remaining for the electrical generator 106. In a particular example, the controller 108 may be configured to change the operation of the electrical generator 106 to operate in a higher efficiency mode based on a fuel level. The particular fuel level may be based on expected operations, limits of the electrical energy storage system 104, present SOC of the electrical energy storage system 104, time remaining in a work period, or the like.

In another example, the controller 108 may be configured to change the operation of the electrical generator 106 based on a state of a thermal management system of the vehicle 100. In a particular example, the controller 108 may be configured to change the operation of the electrical generator 106 if a radiator of the vehicle 100 is clogged or damaged, the thermal management system has a low heat rejection as the ambient temperature is relatively high, the thermal management system has a high heat rejection or the vehicle 100 is passively cooled as the ambient temperature is relatively low or the environment is relatively windy or experiencing high wind gusts, or the like. In another example, the controller 108 may be configured to change the operation of the electrical generator 106 based on an ambient temperature around the vehicle 100 or particular components of the vehicle 100. For example, an ambient temperature may range from about −20 degrees Celsius (C) to about 45° C.

Figure 2:
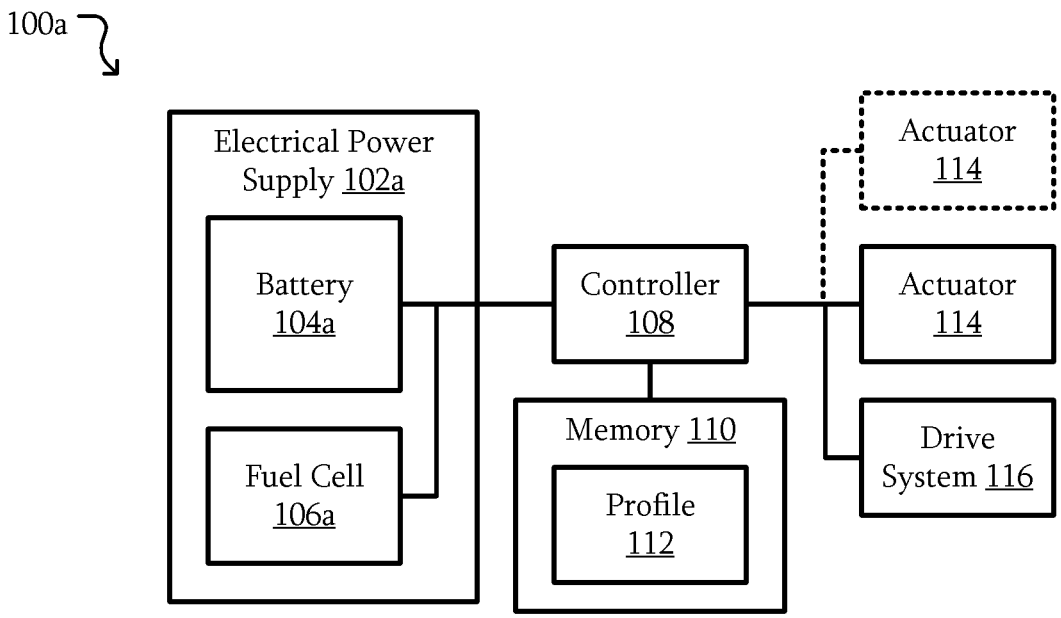
FIG. 2 is a block diagram of a vehicle with a predictive power system including a fuel cell and a battery according to some embodiments.

FIG. 2 is a block diagram of a vehicle 100a with a predictive power system 102a including a fuel cell 106a and a battery 104a according to some embodiments. The vehicle 100a may be similar to the vehicle 100 described above including similar components. In some embodiments, the vehicle 100a includes a power system 102a similar to the power system 102. The power system 102a includes a battery 104a as part of the electrical energy storage system 104 or operating as the electrical energy storage system 104. Examples of the battery 104a include lithium ion batteries, nickel metal hydride batteries, lead acid batteries, a combination of such batteries, banks of such batteries, or the like. Examples of the fuel cell 106a include a hydrogen fuel cell, a methane fuel cell, a combination of such fuel cells, banks of such fuel cells, or the like.

Figure 3:
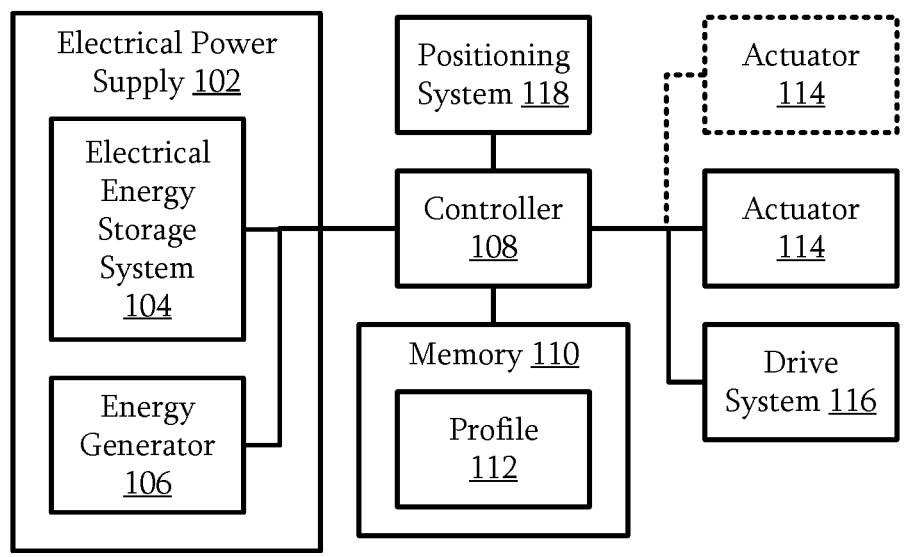
FIG. 3 is a block diagram of a vehicle with a predictive power system including a positioning system according to some embodiments.

FIG. 3 is a block diagram of a vehicle 100b with a predictive power system 102 including a positioning system 118 according to some embodiments. The vehicle 100b may be similar to the vehicles 100 and 100a described above.

However, the vehicle 100b includes a positioning system 118. A positioning system 118 may include an external or network-based positioning system, such as a wireless network positioning system (e.g., a Wi-Fi positioning system), a global navigation satellite system (GNSS), a Global Positioning System (GPS), or the like. The positioning system 118 may be configured to use a technique or algorithm that utilizes or takes into account the following, including, but not limited to: signal triangulation, signal trilateration, signal to noise ratio (SNR), characteristics of signals detected and/or received by the positioning system 118, signal strength, signal attenuation, signal timing, signal propagation time, phase shift, and/or the like to determine a position of the vehicle 100b.

The controller 108 may be coupled to the positioning system 118. The controller 108 may be configured to receive position data from the positioning system 118. As will be described in further detail below, the controller 108 may be configured to use the position data with the profile 112 to determine when to change the operation of the power system 102 before a change in power demand of the vehicle 100b.

Figure 4:
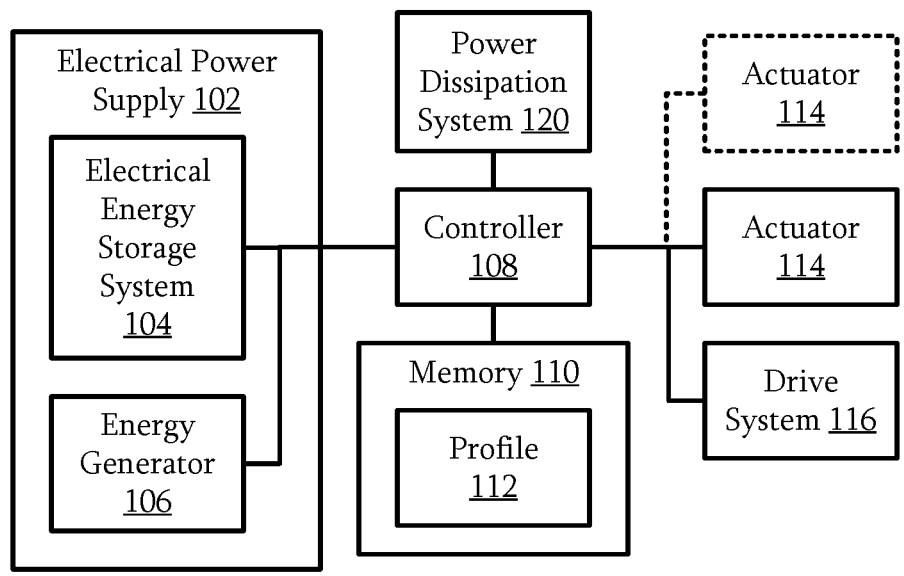
FIG. 4 is a block diagram of a vehicle with a predictive power system including a power dissipation system according to some embodiments.

FIG. 4 is a block diagram of a vehicle 100c with a predictive power system 102 including a power dissipation system 120 according to some embodiments. The vehicle 100c may be similar to the vehicles 100, 100a, and/or 100b. In some embodiments, the vehicle 100c includes a power dissipation system 120. The power dissipation system 120 may include a circuit configured to transform electrical energy into another form of energy that may be dissipated. For example, the power dissipation system 120 may transform electrical energy into heat which may be dissipated into the environment. A specific example of a power dissipation system 120 includes a lossy electrical circuit such as a high voltage direct current (DC) to DC converter circuit such as a chopper circuit.

The controller 108 may be coupled to the power dissipation system 120. The controller 108 may be configured to direct excess electrical energy from the power system 102, the actuator 114, the drive system 116, or the like of the vehicle 100c to the power dissipation system 120. As will be described in further detail below, although the operation of the electrical generator 106 may be changed due to a predicted change in power demand to accommodate an increase in received power, the speed at which the operation of the electrical generator 106 may be changed, the present state of charge (SOC) of the electrical energy storage system 104 may be too high to store the expected regenerated power from the actuator 114 or drive system 116, or the like such that the operation of the electrical energy storage system 104 may exceed a threshold without dissipating the expected power. Accordingly, the controller 108 may direct excess power to the power dissipation system 120 so that the electrical energy storage system 104 may remain within a desired range, the operation of the electrical generator 106 may remain within a desired range, or the like.

A variety of operations of system of a vehicle and interactions of the vehicle with a vehicle management system or the like will be described below. While a particular one of the vehicles 100, 100a, 100b, and 100c of FIGS. 1-4 may be used as an example, in other embodiments, the operations or interactions may be performed with similar vehicles. In other embodiments, a vehicle may include one, several, or all of the different components of vehicles 100, 100a, 100b, and 100c and perform associated operations of such systems as described below.

Figure 5:
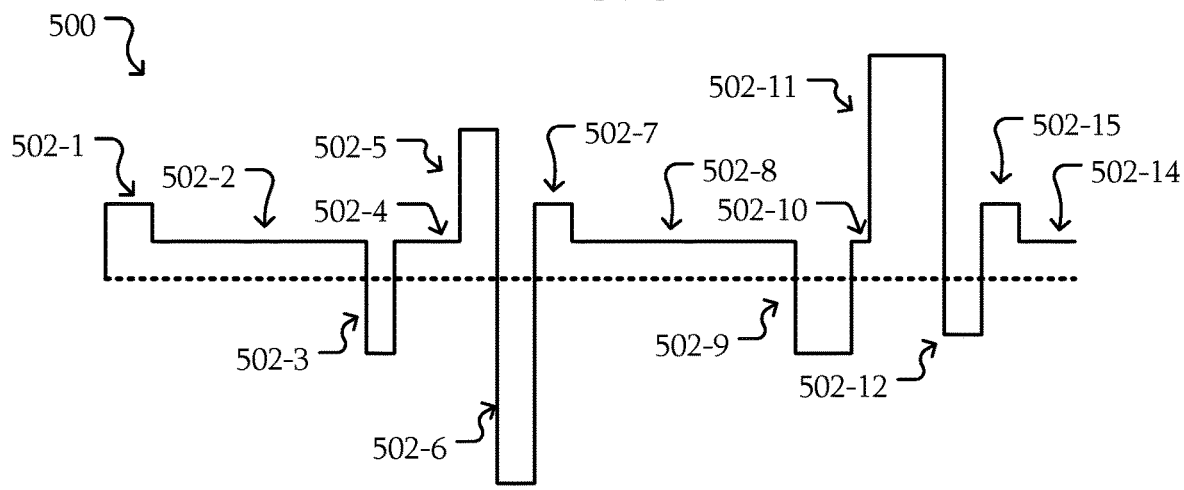
FIG. 5 is a chart of power demand over time of a vehicle according to some embodiments.

FIG. 5 is a chart of power demand over time of a vehicle according to some embodiments. A vehicle 100 may be involved in a variety of operations over time. The power demand 500 may be representative of operations or events 502 over time. The power demand 500 may be positive when power is supplied by the power system 102 and negative when power is received by power system 102 as distinguished by the dashed line. Although positive is used to describe the supply of power and negative is used to describe receiving power, the polarity may be opposite depending on the particular context.

Operations 502-1, 502-2, and 502-3 represent an acceleration of the vehicle 100, the vehicle 100 travelling at a constant speed, and the vehicle 100 decelerating at a destination, respectively. An initial increase in power in operation 502-1 may be provided by the power system 102 to the drive system 116 to accelerate the vehicle 100. That power may be reduced while the vehicle 100 travels. Energy may be regenerated by the drive system 116 and returned to the power system 102 while decelerating.

Operations 502-4 represents maneuvering at the destination including raising of an actuator 114. Operation 502-5 represents lifting a load from a stack at the destination and maneuvering to clear the load from a stack. Operation 502-6 represents energy being regenerated by the actuator 114 as the load is lowered.

Operations 502-7, 502-8, and 502-9 represent acceleration, travelling at a constant speed, and decelerating at a second destination, respectively. Operation 502-10 represents maneuvering at the second destination. Operation 502-11 represents lifting and placing the load. Operation 502-12 represents regeneration of energy while lowering the actuator 114. Operations 502-13 and 502-14 represent acceleration and travelling to another destination, respectively.

Over these various operations, power demanded from the power system 102 may vary, remain relatively constant over a period, have different peaks and valleys of supply and regeneration of power or the like. While a constant power demand has been used as an example of the vehicle 100 maneuvering, the power demand may be different based on the environment of the vehicle 100. For example, the vehicle 100 may be travelling uphill or downhill. The power demand may vary accordingly. Using the profile, the controller 108 may be configured to determine a future power demand from the power system 102 based on the profile 112. As will be described in further detail below, the controller 108 may be configured to modify a present power output of the electrical generator 106 based on the future power demand.

Figure 6A:
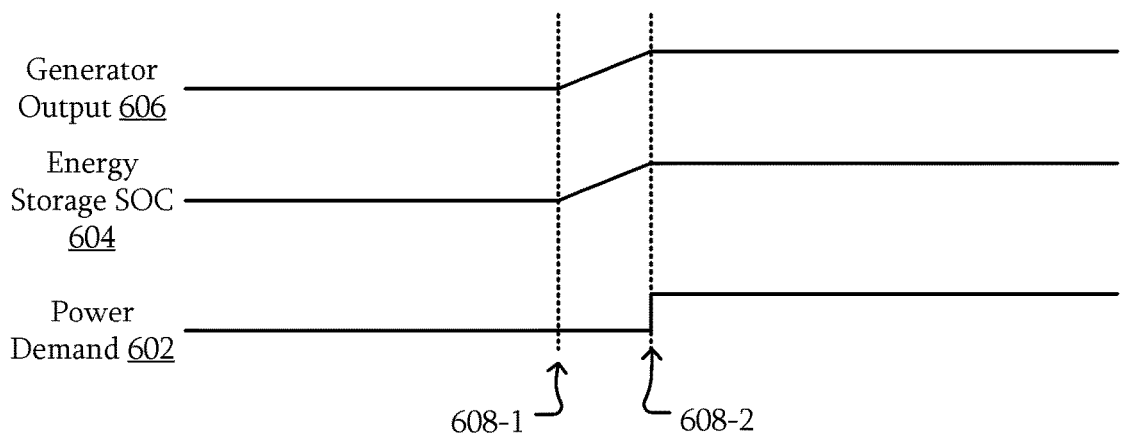
FIG. 6A-6F are charts of stored energy, power supplied, and power demand in a vehicle during control of electrical energy management of a power system according to some embodiments.

FIG. 6A-6F are charts of stored energy, power supplied, and power demand in a vehicle during control of electrical energy management of a power system according to some embodiments. Referring to FIGS. 3, 5, and 6A, the vehicle 100b will be used as an example. In some embodiments, the electrical generator 106 is generating a generator output 606. The electrical energy storage system 104 has a state of charge (SOC) 604. Various systems of the vehicle 100b may be demanding power demand 602. The supply of power from the electrical generator 106 may initially match the power demand 602. As a result, the SOC 604 may remain substantially constant.

At time 608-2, the power demand 602 increases. For example, the vehicle 100b may use an actuator 114 such as a lifting mechanism to lift a load or raise the lifting mechanism to prepare to lift the load, the vehicle 100b may increase power to a drive system 116 to accelerate, or the like. As a result, the power demand 602 of the vehicle 100b increases. Any of the events of FIG. 5 where the power demand 500 increases may correspond to the increase in power demand 602 at time 608-2.

The increase in the power demand 602 may be an increase from any initial power demand 602. For example, the initial power demand 602 may be positive or negative. The power demand 602 may increase at time 608-2 to a greater amount, whether that amount after time 608-2 is positive or negative.

The profile 112 may include information that may be used to predict the increase in power demand 602 at 608-1 and take an action before that event occurs. For example, the profile 112 may indicate that a load may be lifted at a particular location. The positioning system 118 may provide position information for the vehicle 100. By comparing the position of the vehicle 100b, the location of the load, a velocity of the vehicle 100b, a path from the vehicle 100b to the load, attributes of the electrical generator 106, or the like, the controller 108 may determine a time 608-1 at which the generator output 606 of the electrical generator 106 is controlled to begin to increase, before the actual increase in demand occurs at time 608-2. Although various operations where the operation of the electrical generator 106 may be changed prospectively based on a location of the vehicle 100b, in other embodiments, the change may be based on different or additional parameters. For example, the time 608-1 may be predetermined time at which the generator output 606 of the electrical generator 106 of vehicle 100 of FIG. 1 is changed.

In some embodiments, changing the generator output 606 of the electrical generator 106 prospectively may result in benefits for the vehicle 100b. For example, a fuel cell 106a (FIG. 2) as the electrical generator 106 may be adversely affected by a rapid increase in supplied power. If the generator output 606 increases at a rate similar to the increase in the power demand 602 at 608-2, the lifetime, reliability, or the like of the fuel cell 106a may be reduced, increasing the cost of operation. By limiting the rate of change of the generator output 606 by increasing supplied power before vehicle 100b requires an increase in supplied power and thus increasing the amount of time over which the power increase is spread, the detrimental effect on the fuel cell 106a may be reduced or eliminated.

As the power demand 602 has not changed at time 608-1, the increase in the generator output 606 supplied by the electrical generator 106 may be stored in the electrical energy storage system 104. The SOC 604 may increase until the power demand 602 increases at 608-2. Once the power demand increases at time 608-1, the SOC 604 may stabilize.

Figure 6B:
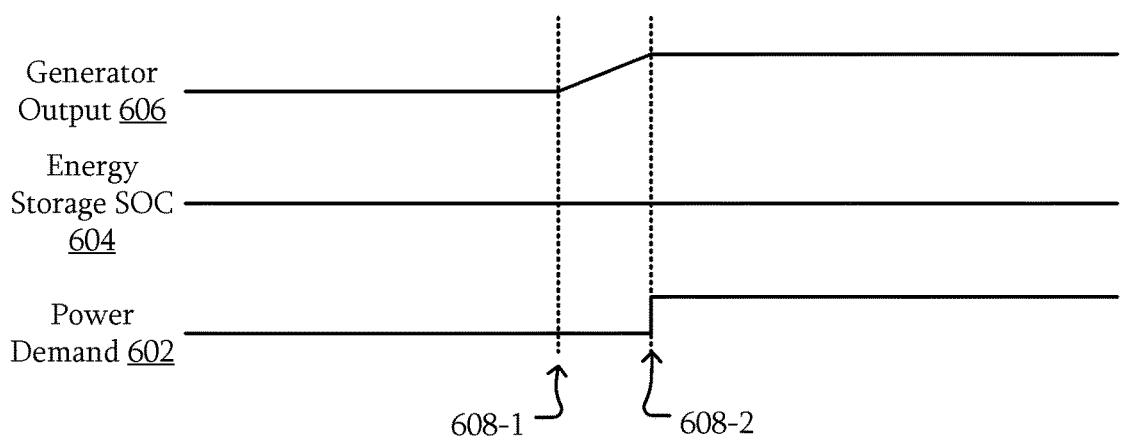

Referring to FIGS. 4 and 6B, in some embodiments, the operation of the vehicle 100c may be similar to that described with respect to FIG. 6A. Optionally, a vehicle may include both a positioning system 118 and a power dissipation system 120. However, the additional power from the electrical generator 106 may be dissipated rather than stored in the electrical energy storage system 104. For example, the SOC 604 may be at or near a limit. In another example, the SOC 604 may not be at a limit, but an amount of energy expected to be regenerated energy from an actuator 114 for the drive system 116 may cause the SOC 604 to exceed the limit. The excess power may be directed towards a power dissipation system 120.

Figure 6C:
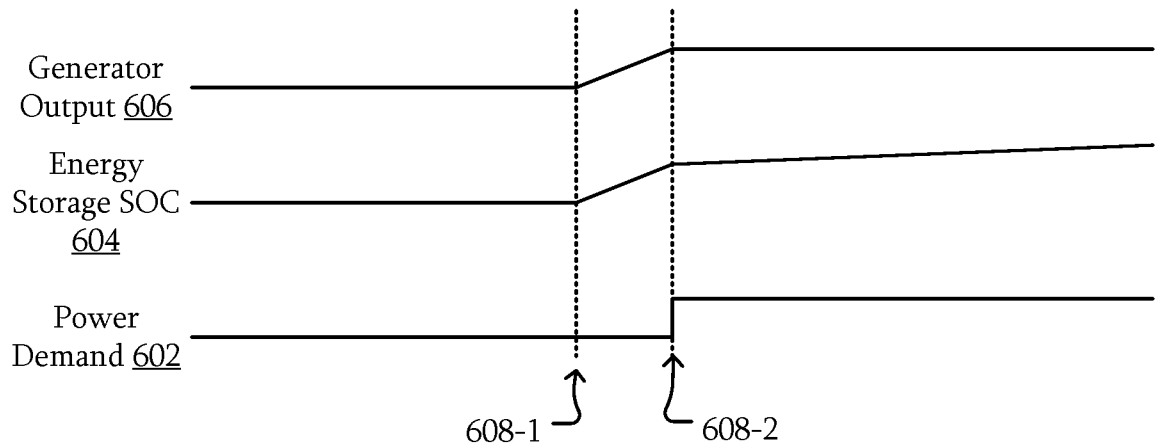

Referring to FIGS. 1 and 6C, in some embodiments, the increase in the generator output 606 supplied by the electrical generator 106 may be greater than the increase in power demand 602. As a result, the SOC 604 may increase to a particular SOC 604 that may be desired at a later time. For example, the cost of fuel for the electrical generator 106 may be lower at a future time. The present fuel for the electrical generator 106 may be used to increase the SOC 604 with the expectation that the fuel is replenished when the cost of fuel is lower in the future. In another example, a power demand 602 in the future may be predicted to exceed the maximum output of the electrical generator 106. The SOC 604 may be increased to accommodate the excess above the maximum output. Although the cost of fuel has been used as an example of a parameters used to determine a target SOC 604, in other embodiments, other parameters may be used. For example, the cost of electricity may change over time, such as changing based on a load on the electrical grid. The target SOC 604 may be decreased so that the electrical energy storage system 104 may be recharged from an external source when a predicted cost of electricity is lower. In a particular example, the cost of electricity may be lower at night. Nearing the end of the session at the end of a day, the SOC 604 may be reduced to be otherwise lower at the end of the session and replenished at night. In another example, the vehicle 100 may be approaching an uphill portion of a route. The SOC 604 may be increased in preparation for that uphill portion such that a decrease in the SOC 604 during the uphill portion does not cause the SOC 604 to decrease below a lower limit.

Figure 6D:
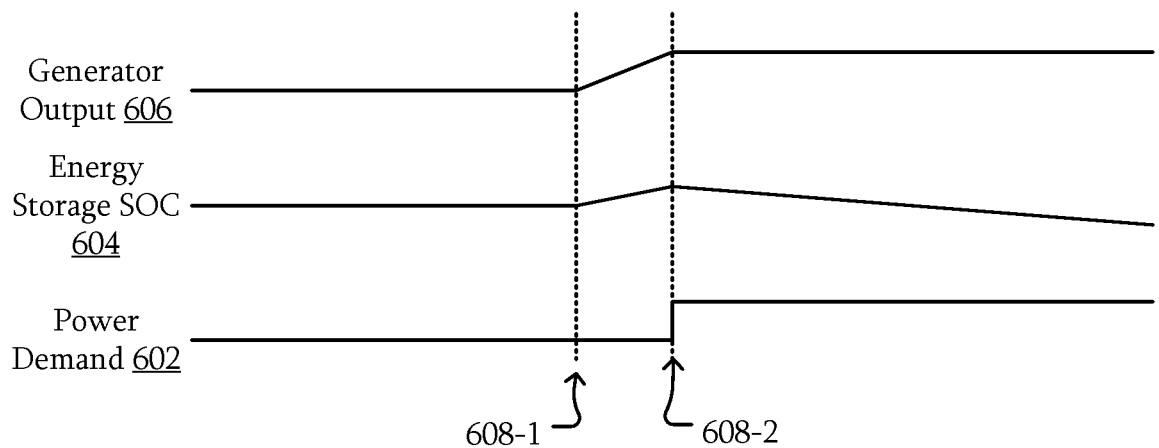

Referring to FIGS. 1 and 6D, in some embodiments, similar to increase of the SOC 604 in FIG. 6C, the generator output 606 of the electrical generator 106 may be controlled such that the SOC 604 decreases even after the increase in the power demand 602. For example, a predicted power demand 602 may be negative at a time after time 608-2. For example, the electrical energy storage system 104 may receive power from regeneration while lowering a particularly heavy load, the vehicle 100 may be travelling on a route that includes a downhill portion where energy may be regenerated from braking, or the like. The increase in energy that would be stored from the regeneration at that future time may exceed the maximum capacity of the electrical energy storage system 104 or a threshold capacity above which the electrical energy storage system 104 may be damaged or the lifetime may be reduced if the SOC 604 was not reduced. Accordingly, the SOC 604 may be reduced before the event occurs such that the SOC 604 does not exceed the maximum or the threshold.

Although various reasons to increase or decrease the SOC 604 have been used as examples, in other embodiments, the SOC 604 may be increased or decreased for other purposes. In addition, although the SOC 604 has been illustrated as continuing to increase or decrease, in some embodiments, a generator output 606 of the electrical generator 106 may be changed at a time after time 608-2 once a desired SOC 604 is obtained.

In some embodiments, the generator output 606 levels may be adjusted such that a power supplied by the electrical energy storage system 104 is less than a maximum limit, a threshold limit for given operating conditions, or other suitable limit. In addition to, or alternative to, adjusting the SOC 604, the generator output 606 of the electrical generator 106 may be adjusted such that the output power from the electrical energy storage system 104 does not exceed such a limit.

Figure 6E:
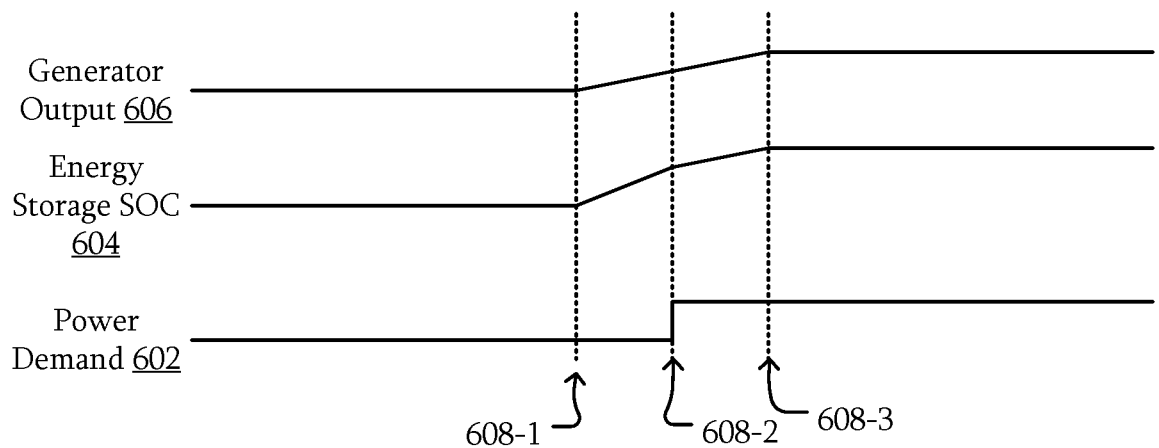

Referring to FIGS. 1 and 6E, in some embodiments, a change in the operation of the electrical generator 106 may occur after a change in the power demand 602. For example, at time 608-1 the generator output 606 may begin to increase before the power demand 602 increases at time 608-2. However, the generator output 606 may continue to increase until time 608-3 after the power demand 602 increased. In some embodiments, the SOC 604 may be lower than desired if the electrical generator 106 generator output 606 stopped increasing at time 608-2. Accordingly, the ramp of the generator output 606 may continue until the SOC 604 reaches the desired level. For example, a desired SOC 604 may be between about 20% to about 80% of a maximum SOC 604. In some embodiments, a desired SOC 604 may be higher than 20%, such as 30%, 40%, or more. In some embodiments, a desired SOC 604 may be within a narrower range such as from about 40% to about 70%. A narrower range may allow for capacity to accommodate opportunity charging, recovery of the vehicle 100 in case of a failure, or the like. In some embodiments, a desired SOC 604 may be a particular value, such as about 50%, about 60%, or the like rather than a particular range. In some embodiments, a depth of discharge (DOD) of the electrical energy storage system 104 may be limited by operation of the electrical generator 106. If the electrical energy storage system 104 is discharging similar to the discharging in FIG. 6D, the electrical generator 106 generator output 606 may continue to increase to limit the DOD.

In another example, the electrical generator 106 may have a maximum power ramp rate to avoid damage or maintain lifetime of the electrical generator 106. The time 608-1 may be too close to the time 608-2 when the power demand 602 increases. To avoid exceeding the maximum ramp rate, the ramp rate may be limited and the ramp may continue until time 608-3 to achieve a desired output power to meet the power demand 602 and to achieve a desired SOC 604. For example, the controller 108 may make a determination that the generator output 606 should increase too close to the time 608-2 based on newly received information. In another example, a previous operation may have prevented the electrical generator 106 from changing operation. Regardless, the electrical generator 106 may not begin to increase the generator output 606 until time 608-1. To reach the desired SOC 604 by time 608-2, the ramp rate of the electrical generator 106 generator output 606 that would reach the desired SOC 604 may exceed the maximum ramp rate. Accordingly, the ramp may continue until time 608-3. An example of a maximum ramp rate of a fuel cell may include about 0.5 to 1.5 kilowatts per second (kW/s). An increase in the power demand 602 may be about 10 to about 150 kW. Another example of a maximum ramp rate of a fuel cell may include about 1 amp per second (A/s). A fuel cell may have specified maximum ramp rates with higher magnitudes such as an increase of about 4 A/s or a decrease of about 10 A/s. A greater ramp rate may decrease a lifetime of the fuel cell. The ramp rate may be operated at a higher level during an emergency, but the ramp rate may be limited during normal operations to maintain or increase the lifetime of the fuel cell.

In some embodiments, the ramp rate of the fuel cell may be limited by filtering, hysteresis, or the like to reduce or eliminate constant fluctuations, abrupt changes, or the like. The timing of the start of a change of the operation of the electrical generator 106 may be adjusted to accommodate the effects of such limiting.

Figure 6F:
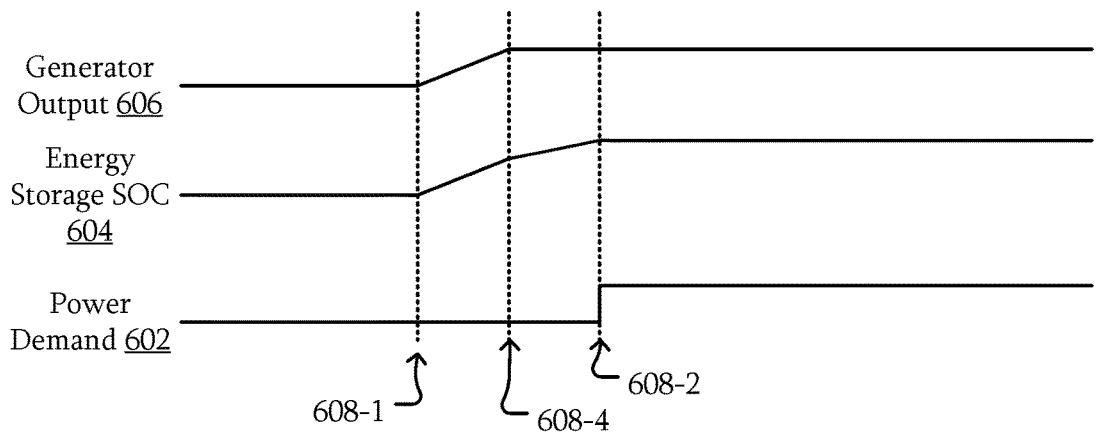

Referring to FIGS. 1 and 6F, in some embodiments, a change in the operation of the electrical generator 106 may end before a change in the power demand 602 occurs. For example, at time 608-1, the generator output 606 may begin to increase. However, at time 608-4 before time 608-2 when the power demand 602 increases, the change in the generator output 606 may end. For example, the increase in power demand 602 may have been expected at time 608-4 but did not occur until time 608-2. The generator output 606 may be changed to limit a change in the SOC 604.

In some embodiments, the various controls of the electrical generator 106 may be implemented at times such that the operation of the electrical generator 106 is within an optimum or maximum efficiency region. For example, for a given future value of an SOC of the electrical energy storage system 104, the electrical generator 106 may be operated at an optimum efficiency mode for a longer time if the output power 606 is less when operating at the optimum efficiency mode.

FIGS. 6A-6F illustrate a variety of operations where the power demand 602 increases. In other embodiments, the power demand 602 may decrease. The operation of the electrical generator 106 may also decrease accordingly. For example, the generator output 606 may begin to decrease before the power demand 602 decreases. The timing, rate, length of change, or the like of the change in the generator output 606 may be similarly modified to achieve the various outcomes described above, such as a particular SOC 604 at a later time.

Referring to FIGS. 5 and 6A-6F, the operations described above may be performed whenever the power demand 500 increases or decreases. The operations may take into account the magnitude of future operations. In addition, not all expected operations may result in a predictive change of the generator output 606. For example, while the generator output 606 may be decreased due to an expected deceleration at 502-3, the generator output 606 may increase or remain the same as a later lifting operation at 502-5 may require energy. However, the generator output 606 may still be decreased due to the expected regenerated energy from lowering the load at 502-6. The expected changes in power demand 602 may be combined to determine how to operate the electrical generator 106.

In some embodiments, the various operations described above may be used to optimize the operation of the electrical generator 106, the electrical energy storage system 104, or the like. The ramp rate of a fuel cell may be limited. The SOC 604 of the electrical energy storage system 104 may be predictively adjusted so that a future operation may be performed without charging or discharging the electrical energy storage system 104 beyond limits to improve a lifetime, capacity, reliability, or the like of the electrical energy storage system 104. The various predicted power demand events 502 may be combined to optimize the operation of the electrical generator 106, the electrical energy storage system 104, or the like.

Figure 7:
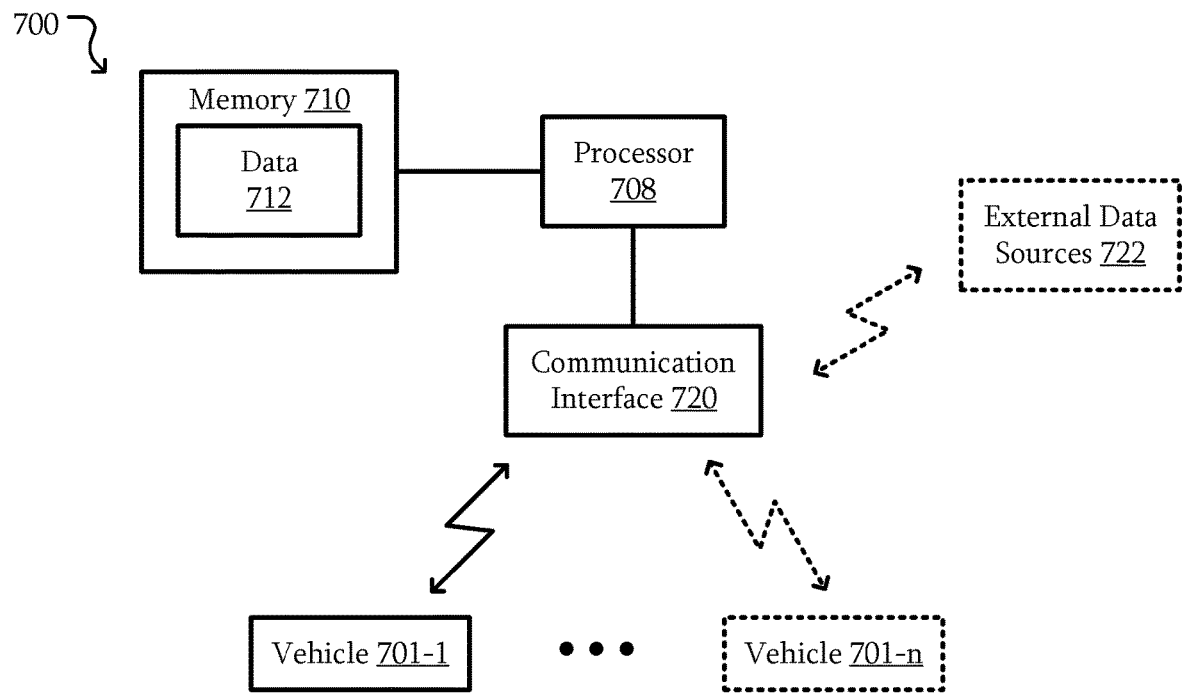
FIG. 7 is a block diagram of a vehicle management system according to some embodiments.

FIG. 7 is a block diagram of a vehicle management system according to some embodiments. Some embodiments include a vehicle management system 700. The vehicle management system 700 includes a processor 708, a memory 710, and a communication interface 720.

The processor 708 may include a general purpose processor, a digital signal processor (DSP), an application specific integrated circuit, a microcontroller, a programmable logic device, discrete circuits, a combination of such devices, or the like. Although only one processor 708 is illustrated, multiple processors 708 may be present, the operations may be distributed across multiple systems, servers, computers, or the like. The processor 708 or parts thereof may have a single processing core or multiple processing cores. The processor or processors 708 may be distributed across multiple systems. The processors 708 may be communicatively coupled together by a network such as a local area network, wide area network, the Internet, or the like.

The memory 710 may include any storage medium. For example, the memory may include a dynamic random access memory (DRAM), according to various standards such as DDR-DDR5 or the like, static random access memory (SRAM), non-volatile memory such as Flash, spin-transfer torque magentoresistive random access memory (STT-MRAM), or Phase-Change RAM, magnetic or optical media, or the like. The memory 710 may include combinations of such memories. The memory 710 may be physically distributed, such as a cloud storage system.

The communication interface 720 may include circuitry that enables the vehicle management system 700 and the vehicles 701 to communicate. The communication interface 720 may allow the vehicle management system 700 to communicate with one or more vehicles 701, represented by vehicles 701-1 to 701-n. In some embodiments, the communication interface 720 may include Ethernet, Bluetooth, WiFi, universal serial bus (USB), External SATA (eSATA), Firewire, a memory card slot, proprietary interfaces, or the like. With such communication interfaces 720, the vehicle management system 700 may be configured to communicate with the vehicles 701 through the associated medium.

The memory 710 is configured to store data 712 related to predicted changes in demand from a power system 102 of a vehicle 701. Examples of the data related to predicted changes in demand include data related to the vehicle 701, site data, scheduling data, environmental data, or the like. Data related to the vehicle 701 may include energy regenerated from lowering a load, energy regenerated from braking, a maximum speed, a maximum braking speed, acceleration/deceleration data, instantaneous speed versus time, average speed, actuator lifting speed, actuator lowering speed, actual load weights, stacking height, or the like. Site data may include data about a worksite of the vehicle 701. Examples of site data include locations of loads, weights of loads, heights of loads, routes to and from loads, elevation changes along the routes, condition of the routes, material of the routes, distances between loads, traffic control systems, traffic control system timing, or the like. Scheduling data may include information related to the operation of the worksite. Examples of scheduling data include sequences of particular loads, destinations of particular loads, scheduled arrival of loads, scheduled departures of loads, operator schedules, operator identities, individual operator histories, session schedules, maintenance schedules, refueling schedules, battery charging schedules, holiday schedules, or the like. Examples of environmental data include a cost of energy, power grid loading, a weather forecast, or the like.

Based on this data 712, the processor 708 is configured to generate a profile 112 for operation of the power system 102 of a vehicle 701 based on the data 712. The processor is configured to transmit the profile 112 to the vehicle 701 through the communication interface 720. As a result, the vehicle 701 may operate using the profile 112 as described above. Each of the types of data 712 described above may be used to determine parameters for operation of the power system 102 such as an SOC of the electrical energy storage system 104, an output power of the electrical generator 106, a rate of change of the output power of the electrical generator 106, or the like.

Figure 8:
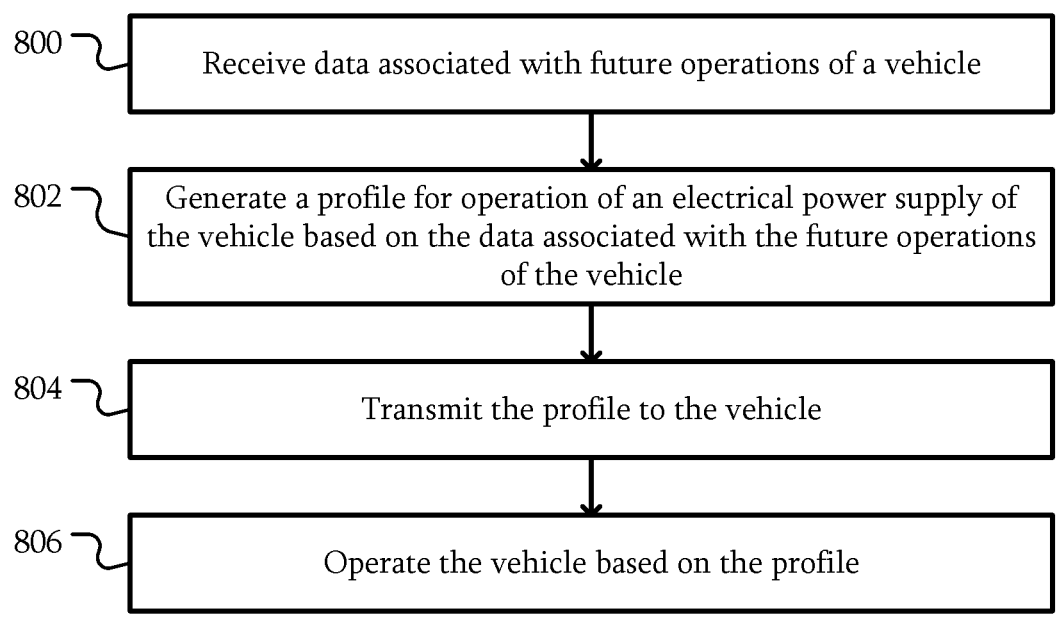
FIG. 8 is a flowchart of an operation of a vehicle management system with control of electrical energy management of a power system of a vehicle according to some embodiments.

FIG. 8 is a flowchart of an operation of a vehicle management system with control of electrical energy management of a power system of a vehicle according to some embodiments. Referring to FIGS. 1 and 7, in some embodiments, a vehicle 100 will be used as an example of a vehicle 701. In step 800, data 712 associated with future operations of a vehicle 701 is received. As described above, the data 712 may include a variety of different types of data. Receiving the data in step 800 may include receiving vehicle data from one or more vehicles 701, receiving other data from external data sources 722 such as a site map, a database of scheduling data, a weather service, or the like. The data 712 may be received through the communication interface 720.

In step 802, a profile 112 for controlling electrical energy management of a power system of a power system 102 of the vehicle 701 is generated based on the data 712 associated with the future operations of the vehicle 701. In some embodiments, the data may be used to determine conditions, states, locations at a worksite, SOC ranges, SOC schedules, refueling schedules, electrical generator 106 ramp rates, electrical generator 106 state changes, or the like. For example, the processor 708 may be configured to generate a distance from a load to be raised at which the electrical generator 106 may begin increasing the output power. The processor 708 may be configured to generate an estimated time of raising a load and an amount of time before that estimated time to begin increasing the output power. The processor 708 may be configured to indicate a change to the output of the electrical generator 106 or indicate a target SOC such that the SOC of the electrical energy storage system 104 is at a level such that capturing energy from lowering a particularly heavy load does not increase the SOC beyond a limit.

In step 804, the profile 112 is transmitted to the vehicle 701. For example, the profile 112 may be transmitted to the vehicle 701 through the communication interface 720. The vehicle 701 may be located at a charging and/or refueling station with a corresponding communication interface. Alternatively, the processor 708 may be configured to transmit the profile 112 to the vehicle 701 when the vehicle 701 is operating in a worksite through a wireless communication interface. Alternatively, the profile 112 may be loaded on a removable storage device such as a USB drive, a mobile device such as a tablet computer, laptop, handheld device, or the like. The device may be connected to the vehicle 701 and the profile 112 may be transferred to the memory 110 of the vehicle 701. Once the profile 112 is received, in step 806, electrical energy management of the power system of the vehicle may be controlled in 806 based on the profile 112 as described above.

In some embodiments, in step 800, the data 712 received may include historical data from the vehicle 701. For example, the processor 708 may receive data from a vehicle 701 such as energy, speed, acceleration, braking, or the like as described above. In step 802, the profile 112 for controlling electrical energy management of the power system 102 of the vehicle 701 may be generated based on the historical data. For example, the processor 708 may receive data indicating that the actuator 114 is using more energy when lifting and/or regenerating less energy when lowering. The processor 708 may generate the profile 112 for operation of the power system 102 of the vehicle 701 based on that deviation.

In some embodiments, in step 800, SOC data for an electrical energy storage system 104 of the power system 102 of the vehicle 701 may be received. For example, the state of charge data may include data on the present SOC data of the vehicle 701, maximum and/or minimum SOC data for the electrical energy storage system 104, or the like. The processor 708 may be configured to receive SOC data from the vehicle 701 and/or from an external data source 722, or the like. In 802, the profile 112 for controlling electrical energy management of the power system 102 of the vehicle 701 may be generated based on the data including SOC data for the electrical energy storage system 104 of the power system 102 of the vehicle 701. For example, the profile 112 may be generated such that when used by the vehicle 701, a time at which the electrical generator 106 power begins to ramp up or down, the rate of change of the electrical generator 106 output power, or the like may be changed based on the state of charge data to achieve a desired SOC for the electrical energy storage system 104, maintain the SOC within a range during future operations.

In some embodiments, in step 800, environmental data associated with an operating environment of the vehicle 701 may be received. For example, the processor 708 may receive environmental data such as a cost of energy, power grid loading, a weather forecast, or the like from the external data sources 722. In step 802, the profile 112 for controlling electrical energy management of the power system 102 of the vehicle 701 may be generated based on the environmental data. For example, the cost of energy may vary over the course of a day. Parameters for the energy usage of the electrical generator 106 may be set in the profile 112 to lower the cost of refueling. In another example, the weather forecast may indicate that an upcoming day will be relatively hot. The SOC of the electrical energy storage system 104 may be set in the profile 112 to be a particular SOC, within a particular range, or the like that is higher than relatively cooler days. The additional stored energy may be used for additional cooling of the vehicle 701. In another example, the electrical energy storage system 104 may operate better at a different SOC for a higher ambient temperature. The different SOC may be set in the profile 112.

In some embodiments, in step 800, scheduling data associated with an operating environment of the vehicle 701 may be received. In step 802, the profile 112 for controlling electrical energy management of the power system 102 of the vehicle 701 may be generated based on the scheduling data. For example, the scheduling data may include data related to upcoming holidays. The SOC for the electrical energy storage system 104 may be set in the profile 112 such that at the end of the session before the holiday, the SOC ends at a desired SOC for storage or lack of use over the holiday. Similarly, the scheduling data may include data on transportation of the vehicle 701. The profile 112 may indicate the SOC of the electrical energy storage system 104 when operations of the vehicle 701 end before the vehicle 701 is transported.

Other scheduling data may be used to adjust the profile 112. For example, a number of ships, train cars, or trucks, etc. arriving with containers may be scheduled for arrival. A particular session may be relatively light or heavy based on the expected containers. The scheduling data may include schedules of operators such as how many operators are available. If fewer operators are available, the profile 112 may be set to achieve a higher performance from the vehicle to allow for the fewer operators to accomplish the scheduled tasks.

In a particular example, the power to raise the load may be K watts (W). A maximum ramp rate of the electrical generator 106 may be R watts per second (W/s). The vehicle 100 may have an average unloaded speed of S meters per second (m/s). The load may be located at a location L. These parameters may be included as part of the profile 112. In operation, the vehicle 100 may determine a distance based on the present output of the electrical generator 106. The electrical generator may be outputting P watts (W). The increase in power for the electrical generator 106 may be K−P. The time to ramp up to that power may be (K−P)/R. The distance from the load at which the power is controlled to increase may be S*(K−P)/R. The vehicle 100 may be configured to determine that distance and, using the location L and the present location of the vehicle 100, begin the power ramp when the vehicle 100 is within that distance from the load. Although determining a distance from the load has been used as an example, in other embodiments, similar parameters and operations may be used to determine a time at which to begin the power ramp.

Although the use of discrete equations may be used to determine particular operations, setpoints, times, power levels, or the like, in other embodiments, a control system, a neural network, artificial intelligence, or other similar systems may be configured to receive the various inputs described above and then determine operations, setpoints, times, power levels, or other suitable controls for the power system. For example, the outputs may include the present electrical generator 106 output, the desired SOC of the electrical energy storage system 104, or the like.

In some embodiments, the use of the profile 112 and a vehicle 100 as described above may allow for the design of the vehicle 100 to have a reduced cost. For example, by managing the SOC of the electrical energy storage system 104 in a predictive manner as described herein, a sufficient capacity of the electrical energy storage system 104 may be available for storage of regenerated energy for expected operations. As a result, power dissipation systems such as the power dissipation system 120 described above may be omitted, reducing the cost of the vehicle. Similarly, reverse or back current protection devices, hydraulic bypass valves, or the like may be omitted.

In some embodiments, the operations of steps 800 and 802 may be performed by the controller 108 of the vehicle 100. Accordingly, the profile 112 may be present on the vehicle 100 already and would not need to be transmitted to the vehicle in 804.

In some embodiments, the reception of data in 800 may include data returned from the vehicle 100 due to the control of the electrical energy management of the power system 102 of the vehicle 100 in 806 based on the profile. For example, during the operation of the vehicle 100 based on the profile in 806, an amount of energy regenerated from lowering a load, an amount of energy used to lift a load, SOC 604, or the like may be measured on the vehicle 100. The measurement may be performed by sensors in the vehicle 100, measuring the SOC 604, measuring a remaining fuel for the electrical generator 106, or the like. This data may be transmitted to the memory 710, transmitted to the external data sources 722, or the like. Eventually, the processor 708 may be configured to use the updated data to generate the profile in 802 as described above and the process may continue.

Some embodiments include a computer readable medium storing instructions that, when executed by a computer, cause the computer to perform the various operations described above. For example, a computer readable medium may store instructions for the controller 108 of a vehicle, instructions for the processor 708, or the like that enable those systems to perform the operations described above.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A vehicle comprising:
a power system comprising an electrical energy storage system and a fuel cell electrically connected to the electrical energy storage system;
a drive system configured to move the vehicle;
an electrically powered actuator that is separate from the drive system, configured to receive energy from the power system, and configured to lift or lower a load;
a memory configured to store a profile, the profile comprising data related to the vehicle, a site at which the vehicle operates, a schedule for the vehicle comprising load weights, load locations, and distances loads are to be moved, and an environment in which the vehicle operates; and
a controller configured to change an operation of the fuel cell before a change in demand from the power system due to the electrically powered actuator lifting or lowering the load based on the profile and a state of the electrical energy storage system.

2. The vehicle of claim 1, further comprising:
a positioning system configured to determine a position of the vehicle;
wherein the controller is further configured to change the operation of the fuel cell before the change in demand from the power system based on the position of the vehicle.

3. The vehicle of claim 1, wherein the controller is further configured to:
determine a future power demand from the power system based on the profile; and
modify a present power output of the fuel cell based on the future power demand to maintain the state of charge of the electrical energy storage system between a desired lower state of charge and a desired upper state of charge, maintain a rate of change of the present power output of the fuel cell below a maximum rate of change of the present power output, and maintain thermal management for the electrical energy storage system and for the fuel cell.

4. The vehicle of claim 3, wherein the controller is further configured to:
modify the present power output of the fuel cell based on the future power demand and a state of charge of the electrical energy storage system.

5. The vehicle of claim 3, wherein the controller is further configured to:
modify the present power output of the fuel cell such that the fuel cell is operating in a maximum efficiency mode when the change in demand from the power system occurs.

6. The vehicle of claim 1, wherein:
the electrical energy storage system includes a battery.

7. The vehicle of claim 1, wherein the change in demand from the power system comprises a change in at least one of:
supplying energy to the electrically powered actuator;
receiving energy from the electrically powered actuator;
supplying energy to the drive system; and
receiving energy from the drive system.

8. The vehicle of claim 1, wherein the controller is further configured to:
change the operation of the fuel cell before the change in demand from the power system based on the profile to limit an input to the electrical energy storage system to be less than a first threshold and/or output power from the electrical energy storage system to be less than a second threshold.

9. The vehicle of claim 1, wherein the controller is further configured to:
limit a variation in the change of the operation of the fuel cell before the change in demand from the power system based on the profile.

10. The vehicle of claim 1, wherein:
the profile further comprises a desired lower state of charge and a desired upper state of charge for the electrical energy storage system, a maximum rate of change of the current power output, and thermal management limits for the electrical energy storage system and for the fuel cell.

11. A method comprising:
receiving data associated with future operations of a vehicle including a drive system configured to move the vehicle and an electrically powered actuator that is separate from the drive system, configured to receive energy from a power system of the vehicle including a fuel cell and an electrical energy storage system, and configured to lift or lower a load;
generating a profile for controlling electrical energy management of the power system of the vehicle based on the data associated with the future operations of the vehicle, the profile comprising data related to the vehicle, a site at which the vehicle operates, a schedule for the vehicle comprising load weights, load locations, and distances loads are to be moved, and an environment in which the vehicle operates; and
controlling the electrical energy management of the fuel cell of the power system of the vehicle before a change in demand from the power system due to the electrically powered actuator lifting or lowering the load based on the profile.

12. The method of claim 11, further comprising:
receiving historical data from the vehicle; and
generating the profile for controlling the electrical energy management of the power system of the vehicle based on the historical data.

13. The method of claim 11, further comprising:
generating the profile for controlling the electrical energy management of the power system of the vehicle based on the data including state of charge data for an electrical energy storage system of the power system of the vehicle.

14. The method of claim 11, further comprising:
receiving environmental data associated with an operating environment of the vehicle; and
generating the profile for controlling the electrical energy management of the power system of the vehicle based on the environmental data.

15. The method of claim 11, further comprising:
receiving scheduling data associated with an operating environment of the vehicle; and
generating the profile for controlling the electrical energy management of the power system of the vehicle based on the scheduling data.

16. A method comprising:
storing data related to predicted changes in demand from a power system of a vehicle including a fuel cell and an electrical energy storage system;
generating a profile for control of electrical energy management of the power system of the vehicle based on the data, the profile comprising data related to the vehicle, a site at which the vehicle operates, a schedule for the vehicle comprising lifting load weights, lifting load locations, and distances lifting loads are to be moved, and an environment in which the vehicle operates;
transmitting the profile to the vehicle; and
performing the electrical energy management of the power system of the vehicle based on the profile transmitted to the vehicle.

17. The method of claim 16, further comprising:
receiving historical data from the vehicle; and
generating the profile for control of the electrical energy management of the power system of the vehicle based on the historical data.

18. The method of claim 16, wherein:
generating the profile for control of the electrical energy management of the power system of the vehicle based on the data comprises generating the profile for control of the electrical energy management of the power system of the vehicle based on state of charge data for the electrical energy storage system of the power system of the vehicle.

19. The method of claim 16, further comprising:
receiving environmental data associated with an operating environment of the vehicle; and
generating the profile for control of the electrical energy management of the power system of the vehicle based on the environmental data.

20. The method of claim 16, further comprising:
receiving scheduling data associated with an operating environment of the vehicle; and
generating the profile for control of the electrical energy management of the power system of the vehicle based on the scheduling data.

21. A vehicle comprising:
a power system comprising an electrical energy storage system and a fuel cell electrically connected to the electrical energy storage system;
a drive system configured to move the vehicle;
a mechanical structure comprising one of an arm, boom, shovel, bucket, and forks;
an electrically powered actuator that is separate from the drive system, configured to receive energy from the power system, and configured to manipulate a load, wherein the electrically powered actuator:
comprises one of a lifting mechanism, telescoping mechanism, hoist, crane, pulley, and winch;
is operatively attached to the mechanical structure; and
is configured to regenerate energy and return energy to the power system;
a memory configured to store a profile, the profile comprising data related to the vehicle, a site at which the vehicle operates, a schedule for the vehicle comprising load weights, load locations, and distances loads are to be moved, and an environment in which the vehicle operates; and
a controller configured to change an operation of the fuel cell before a change in demand from the power system due to the electrically powered actuator manipulating the load based on the profile and a state of the electrical energy storage system.

22. A vehicle comprising:
a power system comprising an electrical energy storage system and a fuel cell electrically connected to the electrical energy storage system;
an electrically powered actuator configured to receive energy from the power system;
a memory configured to store a profile, the profile comprising data related to the vehicle, a site at which the vehicle operates, a schedule for the vehicle comprising load weights, load locations, and distances loads are to be moved, and an environment in which the vehicle operates; and
a controller configured to:
change an operation of the fuel cell before a change in demand from the power system based on the profile and a state of the electrical energy storage system;
determine a future power demand from the power system based on the profile; and
modify a present power output of the fuel cell based on the future power demand to maintain the state of charge of the electrical energy storage system between a desired lower state of charge and a desired upper state of charge, maintain a rate of change of the present power output of the fuel cell below a maximum rate of change of the current power output, and maintain thermal management for the electrical energy storage system and for the fuel cell.

23. The vehicle of claim 22, wherein the controller is further configured to:
modify the present power output of the fuel cell based on the future power demand and a state of charge of the electrical energy storage system.

24. The vehicle of claim 22, wherein the controller is further configured to:
modify the present power output of the fuel cell such that the fuel cell is operating in a maximum efficiency mode when the change in demand from the power system occurs.

25. A vehicle comprising:
a power system comprising an electrical energy storage system and a fuel cell electrically connected to the electrical energy storage system;
an electrically powered actuator configured to receive energy from the power system;
a memory configured to store a profile, the profile comprising data related to the vehicle, a site at which the vehicle operates, a schedule for the vehicle comprising load weights, load locations, and distances loads are to be moved, and an environment in which the vehicle operates; and a controller configured to change an operation of the fuel cell before a change in demand from the power system based on the profile and a state of the electrical energy storage system;

wherein the profile further comprises a desired lower state of charge and a desired upper state of charge for the electrical energy storage system, a maximum rate of change of the current power output, and thermal management limits for the electrical energy storage system and for the fuel cell.

* * * * *